United States Patent
Sugiyama

(10) Patent No.: US 9,300,648 B2
(45) Date of Patent: Mar. 29, 2016

(54) IMAGE PROCESSING APPARATUS AND IMAGE PROCESSING SYSTEM

(71) Applicant: Takashi Sugiyama, Okazaki (JP)

(72) Inventor: Takashi Sugiyama, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 42 days.

(21) Appl. No.: 14/169,481

(22) Filed: Jan. 31, 2014

(65) Prior Publication Data

US 2014/0215576 A1   Jul. 31, 2014

(30) Foreign Application Priority Data

Jan. 31, 2013 (JP) ................. 2013-016310

(51) Int. Cl.
G06F 21/60 (2013.01)
H04L 29/06 (2006.01)
H04N 1/44 (2006.01)

(52) U.S. Cl.
CPC .............. *H04L 63/08* (2013.01); *G06F 21/608* (2013.01); *H04N 1/44* (2013.01)

(58) Field of Classification Search
None
See application file for complete search history.

(56) References Cited

U.S. PATENT DOCUMENTS

| 5,555,244 | A | * | 9/1996 | Gupta et al. | 370/397 |
| 6,067,568 | A | | 5/2000 | Li et al. | |
| 6,313,921 | B1 | * | 11/2001 | Kadowaki | 358/1.15 |
| 6,792,547 | B1 | | 9/2004 | Murata et al. | |
| 7,034,954 | B1 | | 4/2006 | Utsunomiya | |
| 7,039,480 | B2 | | 5/2006 | Ooshima et al. | |
| 7,694,336 | B2 | | 4/2010 | Rinkevich et al. | |
| 7,768,662 | B2 | * | 8/2010 | Berndt et al. | 358/1.14 |
| 2002/0062453 | A1 | * | 5/2002 | Koga | 713/202 |
| 2003/0152231 | A1 | | 8/2003 | Tomita et al. | |
| 2004/0267593 | A1 | * | 12/2004 | Sammons et al. | 705/9 |

(Continued)

FOREIGN PATENT DOCUMENTS

EP   0944238 A1   9/1999
EP   1574930 A2   9/2005

(Continued)

OTHER PUBLICATIONS

Office Action issued in Japanese Patent Application No. 2005-286161 dated Apr. 20, 2010.

(Continued)

*Primary Examiner* — Benjamin Lanier
(74) *Attorney, Agent, or Firm* — Banner & Witcoff, Ltd.

(57) ABSTRACT

An image processing apparatus comprising: an image processing unit configured to perform image processing; and a control device configured to perform: transmitting the authentication information received by the input unit to the server; receiving a result of user authentication from server, the result indicating a specific user authenticated by the server; requesting individual restriction information for the specific user when the result received, determining whether the requested individual restriction information for the specific user is obtained; restricting the performance of the image processing based on the requested individual restriction information, when the requested individual restriction information is obtained; requesting common restriction information when the requested individual restriction information is not obtained, obtaining the requested common restriction information; and restricting the performance of the image processing based on the obtained common restriction information.

6 Claims, 11 Drawing Sheets

| ID | AFFILIATION | USER NAME | PASSWORD | RESTRICTION INFOMATION ||||| |
|---|---|---|---|---|---|---|---|---|---|
| | | | | PRINTING | COPYING | FAX | SCANNING | MAXIMUM NUMBER | REMAINING NUMBER |
| 000 | — | AUTHENTICATED USER | — | × | × | ○ | ○ | 200 | 500 |
| 001 | GROUP A | USER 1 | — | ○ | ○ | ○ | ○ | — | — |
| 002 | GROUP A | USER 2 | — | ○ | ○ | ○ | ○ | 1000 | 5000 |
| 003 | LOCAL | USER 11 | 8765 | ○ | ○ | ○ | ○ | 500 | 500 |
| 004 | LOCAL | USER 12 | 4321 | × | × | ○ | ○ | 100 | 300 |
| 005 | LOCAL | USER 13 | 0123 | × | × | × | ○ | 100 | 500 |

341

(56) References Cited

U.S. PATENT DOCUMENTS

| | | |
|---|---|---|
| 2005/0007619 A1 | 1/2005 | Minato |
| 2005/0185217 A1 | 8/2005 | Nishizawa et al. |
| 2005/0204144 A1 | 9/2005 | Mizutani |
| 2006/0026434 A1 | 2/2006 | Yoshida et al. |
| 2006/0061451 A1 | 3/2006 | Chen |
| 2006/0064753 A1* | 3/2006 | Otake et al. .............. 726/19 |
| 2007/0076241 A1 | 4/2007 | Okamoto |
| 2007/0079363 A1 | 4/2007 | Itoh |
| 2007/0171466 A1 | 7/2007 | Shigeeda |
| 2010/0020355 A1* | 1/2010 | Imai .................... 358/1.15 |

FOREIGN PATENT DOCUMENTS

| | | |
|---|---|---|
| JP | H10-58796 A | 3/1998 |
| JP | 2001-016383 A | 1/2001 |
| JP | 2001-218272 A | 8/2001 |
| JP | 2001-358848 A | 12/2001 |
| JP | 2002-152446 A | 5/2002 |
| JP | 2003-167716 A | 6/2003 |
| JP | 2003-244354 A | 8/2003 |
| JP | 2004-199521 A | 7/2004 |
| JP | 2005-011321 A | 1/2005 |
| JP | 2005-216260 A | 8/2005 |
| JP | 2007-097024 A | 4/2007 |
| JP | 2007-201638 A | 8/2007 |
| JP | 2012-203660 A | 10/2012 |

OTHER PUBLICATIONS

Search Report issued in European Application No. 06254961.3 dated Dec. 27, 2006.
Office Action issued in corresponding European Application No. 06 254 961.3 dated Apr. 15, 2009.
Office Action issued in corresponding U.S. Appl. No. 11/529,259 mailed Oct. 30, 2007.
Office Action issued in corresponding U.S. Appl. No. 11/529,259 mailed Apr. 2, 2008.
Office Action issued in corresponding U.S. Appl. No. 11/529,259 mailed Dec. 10, 2008.
Office Action issued in corresponding U.S. Appl. No. 11/529,259 mailed Aug. 4, 2009.
Office Action issued in corresponding U.S. Appl. No. 11/529,259 mailed Jan. 7, 2010.
Office Action issued in corresponding U.S. Appl. No. 11/529,259 mailed May 6, 2010.
Toshiba Tec Corporation, e-Studio3511/4511 Template, Ver. 0.1, dated Jun. 13, 2003.
Bizhub 750/600 User Guide (Aug. 2005).

* cited by examiner

| ID | AFFILIATION | USER NAME | PASSWORD |
|---|---|---|---|
| 0001 | GROUP A | USER 1 | 1234 |
| 0002 | GROUP A | USER 2 | 5678 |
| 0003 | GROUP A | USER 3 | 9012 |
| 0004 | GROUP B | USER 4 | 3456 |
| 0005 | GROUP B | USER 5 | 7890 |
| 0006 | GROUP B | USER 6 | 0987 |
| 0007 | GROUP C | USER 7 | 6543 |
| 0008 | GROUP C | USER 8 | 2109 |

| ID | AFFILIATION | USER NAME | PASSWORD | RESTRICTION INFOMATION ||||| |
|---|---|---|---|---|---|---|---|---|
| | | | | PRINTING | COPYING | FAX | SCANNING | MAXIMUM NUMBER | REMAINING NUMBER |
| 000 | — | AUTHENTICATED USER | — | × | × | ○ | ○ | 200 | 500 |
| 001 | GROUP A | USER 1 | — | ○ | ○ | ○ | ○ | — | — |
| 002 | GROUP A | USER 2 | — | ○ | ○ | ○ | ○ | 1000 | 5000 |
| 003 | LOCAL | USER 11 | 8765 | ○ | ○ | ○ | ○ | 500 | 500 |
| 004 | LOCAL | USER 12 | 4321 | × | × | ○ | ○ | 100 | 300 |
| 005 | LOCAL | USER 13 | 0123 | × | × | × | ○ | 100 | 500 |

FIG. 7

| ID | AFFILIATION | USER NAME | PASSWORD | RESTRICTION INFOMATION ||||||
|---|---|---|---|---|---|---|---|---|---|
| | | | | PRINTING | COPYING | FAX | SCANNING | MAXIMUM NUMBER | REMAINING NUMBER |
| 000 | — | AUTHENTICATED USER | — | × | × | ○ | ○ | 500 | 500 |
| 001 | GROUP A | USER 1 | — | △ | △ | ○ | ○ | △ | — |
| 002 | GROUP A | USER 2 | — | △ | △ | ○ | ○ | △ | 5000 |
| 003 | LOCAL | USER 11 | 8765 | ○ | ○ | ○ | ○ | 500 | 500 |
| 004 | LOCAL | USER 12 | 4321 | × | × | ○ | ○ | 100 | 300 |
| 005 | LOCAL | USER 13 | 0123 | × | ○ | × | ○ | 100 | 500 |
| 006 | GROUP A | AUTHENTICATED USER | — | ○ | × | ○ | ○ | △ | 600 |
| 007 | GROUP B | AUTHENTICATED USER | — | × | × | ○ | ○ | — | 600 |

| ID | SERVER | AFFILIATION | USER NAME | PASSWORD | RESTRICTION INFOMATION ||||||
|---|---|---|---|---|---|---|---|---|---|---|
| | | | | | PRINTING | COPYING | FAX | SCANNING | MAXIMUM NUMBER | REMAINING NUMBER |
| 000 | — | — | AUTHENTICATED USER | — | × | × | ○ | ○ | 500 | 500 |
| 001 | FIRST SERVER | GROUP A | USER 1 | — | ○ | ○ | ○ | ○ | — | — |
| 002 | FIRST SERVER | GROUP A | USER 2 | — | ○ | ○ | ○ | ○ | 1000 | 5000 |
| 003 | — | LOCAL | USER 11 | 8765 | ○ | ○ | ○ | ○ | 500 | 500 |
| 004 | — | LOCAL | USER 12 | 4321 | × | × | ○ | ○ | 100 | 300 |
| 005 | — | LOCAL | USER 13 | 0123 | × | × | × | ○ | 100 | 500 |
| 006 | FIRST SERVER | GROUP A | AUTHENTICATED USER | — | ○ | ○ | ○ | ○ | 600 | 600 |
| 007 | FIRST SERVER | GROUP B | AUTHENTICATED USER | — | × | × | ○ | ○ | — | 600 |
| 008 | SECOND SERVER | — | AUTHENTICATED USER | — | × | × | ○ | ○ | — | 600 |

| ID | AFFILIATION | USER NAME | RESTRICTION INFOMATION ||||
|---|---|---|---|---|---|---|
| | | | PRINTING | COPYING | FAX | SCANNING | MAXIMUM NUMBER |
| 000 | — | AUTHENTICATED USER | × | × | ○ | ○ | 500 |
| 001 | GROUP A | USER 1 | ○ | ○ | ○ | ○ | — |
| 002 | GROUP A | USER 2 | ○ | ○ | ○ | ○ | 1000 |
| 999 | — | UNAUTHENTICATED USER | × | × | × | ○ | 100 |

IMAGE PROCESSING APPARATUS AND IMAGE PROCESSING SYSTEM

CROSS-REFERENCE TO RELATED APPLICATION

This application claims priority from Japanese Patent Application No. 2013-016310 filed on Jan. 31, 2013, the entire subject matter of which is incorporated herein by reference.

TECHNICAL FIELD

This disclosure relates to an image processing apparatus and an image processing system for performing image processing. Specifically, this disclosure relates to a technology for performing user authentication in a server connected to an image processing apparatus, and restricting performance of image processing for each user.

BACKGROUND

Known is an image processing system including an image processing apparatus and a server connected each other. The server is configured to authenticate each user of the image processing apparatus based on user information. The user information may include user identification information and restriction information. The user identification information is for identifying the particular user. The restriction information is for indicating how the performance of certain functions of the image processing apparatus is restricted. The image processing apparatus is configured to restrict performance of the image processing for each user in accordance with authentication result at the server. Examples of restriction on the image processing may be maximum printing amount in a day, color printing not permitted and facsimile transmission not permitted.

SUMMARY

However, in the above described technology according to the background art, there are the following problems. That is, since the above-mentioned restriction information has to be set by an administrator of the system, a new user even who has been registered already cannot use any functions of the image processing apparatus without the setting of the restriction information by the administrator. It is inconvenient for the new user. Further, it is troublesome for the administrator to set the restriction information applied to every registered user in order to allow the user authenticated by the server to operate the image processing apparatus.

This disclosure provides at least a technology for reducing inconvenience of a user and trouble of an administrator in an image processing system which includes an image processing apparatus and a sever and restricts performance of image processing for each user.

An image processing apparatus of this disclosure includes: an input unit configured to receive input of authentication information; a communication unit configured to communicate with a server, the sever being configured to perform user authentication in accordance with the authentication information; an image processing unit configured to perform image processing; and a control device. The control device is configured to perform: transmitting the authentication information received by the input unit to the server; receiving a result of user authentication from server, the result indicating a specific user authenticated by the server; requesting individual restriction information for the specific user when the result received, the individual restriction information indicating at least one of performable image processing and performable amount of the image processing; determining whether the requested individual restriction information for the specific user is obtained; restricting the performance of the image processing based on the requested individual restriction information, when the requested individual restriction information is obtained; requesting common restriction information when the requested individual restriction information is not obtained, the common restriction information indicating at least one of the performable image processing and performable amount of the image processing; obtaining the requested common restriction information; and restricting the performance of the image processing based on the obtained common restriction information.

The image processing apparatus disclosed in this disclosure obtains, as necessary, each of the individual restriction information to be applied for the individual users, and the common restriction information to be applied for every user authenticated, as information restricting at least one of performable image processing and performable amount of image processing. The image processing apparatus may obtain those information from a storage unit of the image processing apparatus or may obtain those information from an external device. Further, the image processing apparatus receives user input of authentication information, and instructs the server to perform user authentication based on the authentication information. Thereafter, if the user authentication succeeds, the image processing apparatus determines whether it is possible to obtain individual restriction information corresponding to the authenticated user. If it is possible to obtain the corresponding individual restriction information, the image processing apparatus restricts performance of image processing based on the corresponding individual restriction information. Meanwhile, if it is impossible to obtain the corresponding individual restriction information, the image processing apparatus restricts performance of image processing based on the common restriction information.

That is, in the image processing apparatus disclosed in this disclosure, if user authentication succeeds, even if there is no restriction information (individual restriction information) corresponding to the user, performance of image processing is restricted based on restriction information (the common restriction information) which is not for specified user. Therefore, at least some kinds of image processing become performable without setting of individual restriction information by an administrator. Therefore, inconvenience of users is reduced, and trouble of the administrator is less.

Meanwhile, an image processing apparatus of another aspect of this disclosure includes: an input unit configured to receive input of authentication information of a user; a communication unit configured to communicate with a server, the sever being configured to perform user authentication in accordance with the authentication information; an image processing unit configured to perform image processing; and a control device. The control device is configured to perform: transmitting the authentication information received by the input unit to the server; receiving a result of user authentication from server, the result indicating a specific user authenticated by the server; obtaining common restriction information for every user, who are authenticated by the server, including the specific user when the result received, the common restriction information indicating at least one of performable function and performable amount of the image processing; and restricting the performance of the image processing based on the obtained common restriction information.

Meanwhile, an image processing system of this disclosure includes an image processing apparatus for performing image processing and a server storing user information identifying users, and the image processing system includes: a control device configured to perform: transmitting authentication information of a user received by the image processing apparatus to the server; performing user authentication based on the authentication information and the user information on the server; requesting individual restriction information for the user when the user is authenticated by the server, the individual restriction information indicating at least one of the performable image processing and performable amount of the image processing; determining whether the requested individual restriction information for the user is obtained; restricting the performance of the image processing based on the requested individual restriction information, when the requested individual restriction information is obtained; requesting common restriction information when the requested individual restriction information is not obtained, the common restriction information indicating at least one of the performable image processing and performable amount of the image processing; obtaining the requested common restriction information; and restricting the performance of the image processing based on the obtained common restriction information.

According to this disclosure, it is possible to achieve a technology for reducing inconvenience of a user and trouble of an administrator in an image processing system which includes an image processing apparatus and a server and restricts performance of image processing for each user.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 is a view illustrating a configuration of a user registration table of an authentication server;

FIG. 3 is a view illustrating a configuration of a user restriction table of a multi-function peripheral (MFP) of a first illustrative embodiment;

FIG. 7 is a view illustrating a configuration of a user restriction table of an MFP of a second illustrative embodiment;

FIG. 9 is a view illustrating a configuration of a user restriction table of an MFP of a third illustrative embodiment;

FIG. 12 is a view illustrating another configuration of the user restriction table of the MFP of the illustrative embodiment.

DETAILED DESCRIPTION

Hereinafter, an image processing system according to the present illustrative embodiment will be described in detail with respect to the accompanying drawings. The present illustrative embodiment has been obtained by applying this disclosure to an image processing system having an authentication server for performing user authentication, and a multi-function peripheral (MFP) having a plurality of functions relating to image processing.

[Overall Configuration of Image Processing System]

Figure 1:
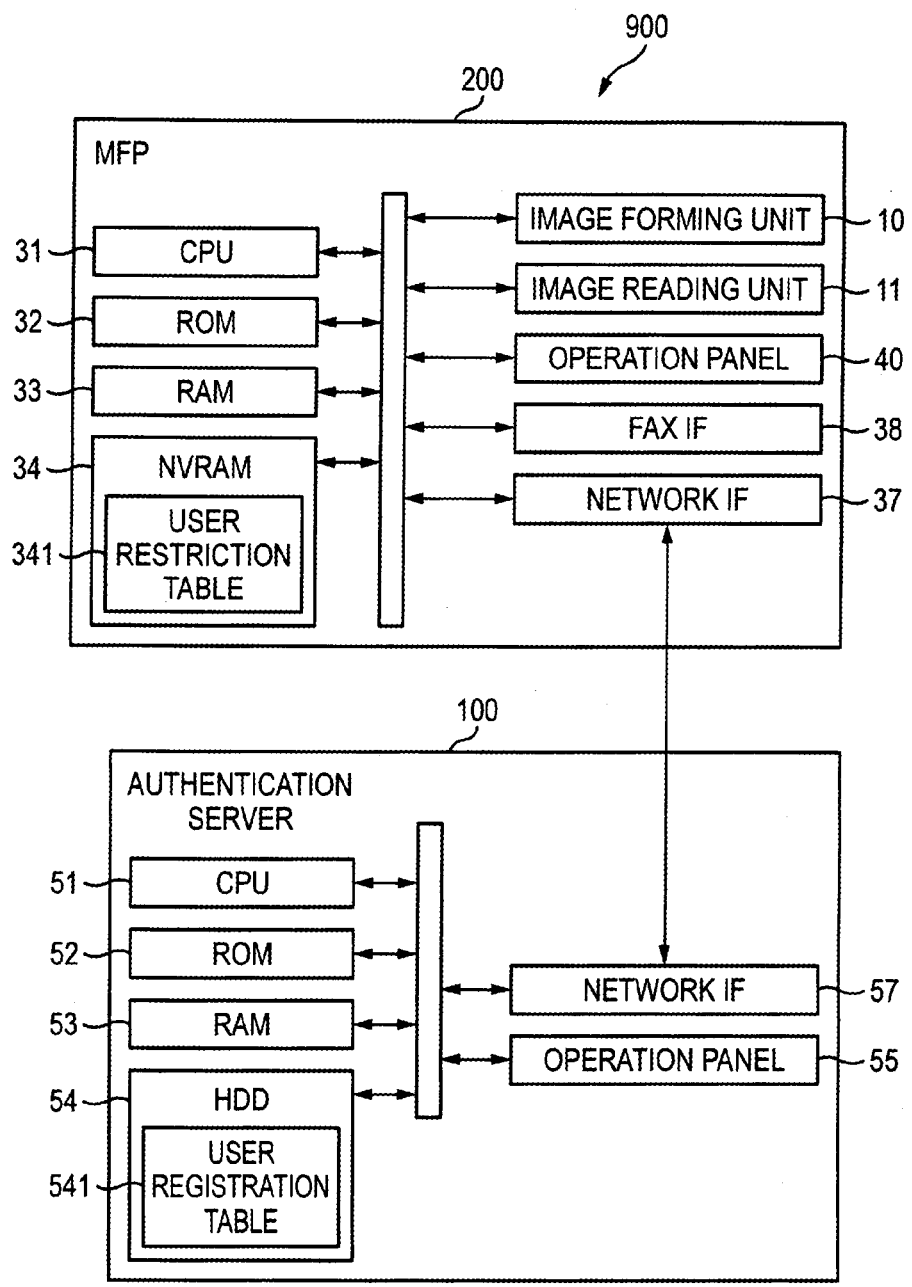
FIG. 1 is a block diagram illustrating a configuration of an image processing system according to an illustrative embodiment.

As shown in FIG. 1, an image processing system 900 (an example of an image processing system) of the present illustrative embodiment includes an authentication server 100 (an example of a server) and an MFP 200 (an example of an image processing apparatus). The MFP 200 has a plurality of functions relating to image processing, such as printing and reading. Also, the MFP 200 outputs an authentication request to the authentication server 100 and restricts performance of image processing based on the authentication result. In response to the authentication request, the authentication server 100 performs user authentication based on user information attached to the authentication request, and transmits the result of the authentication as a response.

In the image processing system 900, as the image processing apparatus having an image processing function, not only the MFP 200 but also some others may be connected. Also, even with respect to the authentication server for performing user authentication, not only the authentication server 100 but also some others may be connected.

[Configuration of Authentication Server]

Hereinafter, a schematic configuration of the authentication server 100 will be described. As shown in FIG. 1, the authentication server 100 has a CPU 51, a ROM 52, a RAM 53, and an HDD 54. Also, the authentication server 100 includes an operation panel 55 having both of a display function and an input function, and a network interface 57 enabling communication with an external device, which are controlled by the CPU 51.

In the HDD 54 of the service server 110, there are stored a variety of programs and data, such as an OS, a browser for browsing data on the Internet, and device drivers for controlling a variety of devices.

Also, in the HDD 54, there is stored a user registration table 541 as shown in FIG. 2, as information for performing user authentication. Specifically, the user registration table 541 stores records each of which includes four items such as "IDENTIFICATION NUMBER (ID)", "AFFILIATION", "USER NAME", and "PASSWORD" stored therein. Also, the configuration of each record of the user registration table 541 is not limited to those, but may include other. Also, each record needs only to include information capable of specifying a user, and does not necessarily need to include all of "AFFILIATION", "USER NAME", and "PASSWORD".

The CPU 51 performs a variety of processes while storing computation results in the RAM 53 or HDD 54, according to a control program read from the ROM 52, or a program read from the HDD 54.

The network interface 57 is an interface enabling communication with other devices. The server 100 can perform communication of data with the MFP 200 through the network interface 57.

[Configuration of MFP]

Subsequently, a schematic configuration of the MFP 200 will be described. As shown in FIG. 1, the MFP 200 includes a CPU 31 (an example of a control device), a ROM 32, a RAM 33, and a non-volatile RAM (NVRAM) (an example of a storage unit) 34. Also, the MFP 200 includes an image forming unit 10 (an example of an image processing unit) for printing images onto sheets, an image reading unit 11 (an example of the image processing unit) for reading images of documents, an operation panel 40 (an example of an input unit or a setting unit) having both of a display function and an input function, a FAX interface 38, and a network interface 37 (an example of a communication unit), which are controlled by the CPU 31.

The image forming unit 10 may be capable of color printing, or may be capable of monochrome printing. In the present illustrative embodiment, it is assumed that the image forming unit 10 is capable of color printing. Also, with respect to a printing type, the image forming unit 10 may be an electrophotographic type or may be an inkjet type. Also, the image reading unit 11 may be capable of color scanning or may be capable of monochrome scanning. In the present illustrative embodiment, it is assumed that the image reading unit 11 is capable of color scanning. Also, a reading mechanism may be a CCD or may be a CIS.

In the ROM 32, there are stored firmware which is a control program for controlling the MFP 200, a variety of options, initial values, and so on. The RAM 33 and the NVRAM 34 are used as work areas to which a variety of control programs are read, or as memory areas for temporarily storing data.

The CPU 31 controls the individual components of the MFP 10 while storing processing results in the RAM 33 or the NVRAM 34, according to control programs read from the ROM 32, and signals transmitted from a variety of sensors.

The network interface 37 and the FAX interface 38 are interfaces enabling communication with other devices. Through the network interface 37, the MFP 200 transmits authentication requests to the authentication server 100, and receives authentication results. Also, through the FAX interface 38, the MFP 200 can perform transmission and reception of FAX data.

The operation panel 40 is provided on the exterior of the MFP 200, and has a variety of buttons for receiving user's inputs, and a touch panel for displaying messages and set contents. As the variety of buttons, there are, for example, an OK button for inputting a start instruction of image processing, and a cancel button for inputting a cancellation instruction of image processing. Also, a user will touch the touch panel, thereby capable of a variety of inputs, and for example, various options and user information can be input from the touch panel.

Also, in the NVRAM 34, there is stored a user restriction table 341 as shown FIG. 3, as information for restricting performance of image processing. Specifically, the user restriction table 341 has records, each of which includes five items "IDENTIFICATION NUMBER (ID)", "AFFILIATION", "USER NAME", "PASSWORD", and "RESTRICTION INFORMATION" stored therein.

Also, the "RESTRICTION INFORMATION" is information representing individual performable function and performable amount of image processing. Specifically, in the "RESTRICTION INFORMATION", permission of performance of each kind of image processing such as printing, copying, FAX, and scanning is stored. In FIG. 3, a symbol "○" means permission of performance, and a symbol "x" means prohibition of performance. Also, in the "RESTRICTION INFORMATION", a "MAXIMUM NUMBER" representing a maximum number of processing pages performable by one jab is stored. In the "MAXIMUM NUMBER", a symbol "-" means that there is no restriction on the maximum number of processing pages. Also, in each restriction information, a "REMAINING NUMBER OF PAGES" representing the remaining number of processable pages is stored. Also, the record configuration of the user restriction table 341 is not limited thereto, but may include other. Also, it is only needed that information specifying each user and restriction information corresponding to the corresponding user are associated with each other, and thus each record does not necessarily need to use all of the "AFFILIATION", "USER NAME", and "PASSWORD".

As records which are registered in the user restriction table 341, there are records for authenticated users who are users authenticated by the authentication server 100, and records for local users who are users specified by the MFP 200. In the example shown in FIG. 3, records for authenticated users and records for local users can be distinguished by whether the "AFFILIATION" is "LOCAL", and records having IDs "000", "001", and "002" correspond to records for authenticated users, and the others correspond to records for local users.

In each record for an authenticated user, it try to corresponds the "AFFILIATION" and "USER NAME" with information registered in the user registration table 541 of the authentication server 100. If a user is authenticated by the authentication server 100, the MFP 200 extracts a record corresponding to the authenticated user, from the user restriction table 341, and restricts performance of image processing according to the restriction information of the extracted record. Also, records for authenticated users are not used for user authentication. For this reason, the "PASSWORD" is represented by a symbol "-" meaning that any password has not been set or stored.

Also, the user restriction table 341 may not necessarily include records corresponding to all of users registered in the user registration table 541. For example, in the authentication server 100, records of all employees may be recorded, and in the MFP 200, records of only employees belonging to a department in which the MFP 200 has been installed may be registered.

As described above, in the user restriction table 341, there are not always records corresponding to all users registered in the user registration table 541. For this reason, there may be a case where there is no record corresponding to the authenticated user in the MFP 200 and a user authentication by the authentication server 100 is succeeded. Therefore, there is an authenticated-user common record, in which "AUTHENTICATED USER" is set as the "USER NAME" and any individual user is specified, that is, a record applicable to every authenticated user in the user restriction table 341. The record having the ID "000" corresponds to that common record. Hereinafter, the common record will be referred to as the authenticated-user common record. Meanwhile, records for authenticated users specifying the users, like the records having the IDs "001" and "002" will be referred to as "authenticated-user individual records". The authenticated-user common record is an example of common restriction information. Also, the authenticated-user individual records are examples of individual restriction information.

Also, by the authenticated-user common record, the MFP 200 cannot restrict permission of performance of image processing for each user. For this reason, it is preferable that the authenticated-user common record should further restrict performance of image processing as compared to the authenticated-user individual records. Specifically, in the authenticated-user common record, at least one of performable function and performable amount of image processing is less than those of authenticated-user individual records. For example, in the example shown in FIG. 3, the authenticated-user common record represents that printing and copying are not performable, whereas authenticated-user individual records represent that both of printing and copying are performable. Also, the authenticated-user common record further restricts the performable amount as compared to the authenticated-user individual records.

Meanwhile, the records for local users are used for the MFP 200 to specify users. In a case where "LOCAL" has been input to the "AFFILIATION", the MFP 200 specifies a user, without requesting the authentication server 100 to perform authentication. To this end, it is necessary to set a password in each record for a local user. Hereinafter, a record for a local user specified by the MFP 200 without authentication in the authentication server 100 will be referred to as a local-user individual record. Each local-user individual record is an example of unauthenticated restriction information.

Also, the user restriction table 341 is stored in the NVRAM 34 during shipment of the MFP 200 from a factory. Setting of each record into the user restriction table 341 is performed by an administrator after shipment from the factory.

[Outline of Operation of Image Processing System]

Subsequently, the outline of the operation of the image processing system 900 will be described. In the image processing system 900, in advance, user information is registered in the user restriction table 341 of the authentication server 100 by an administrator. Also, in advance, restriction information of each user is set in the user registration table 541 of the MFP 200 by an administrator. The administrator of the authentication server 100 and the administrator of the MFP 200 may be the same or may be different.

Figure 4:
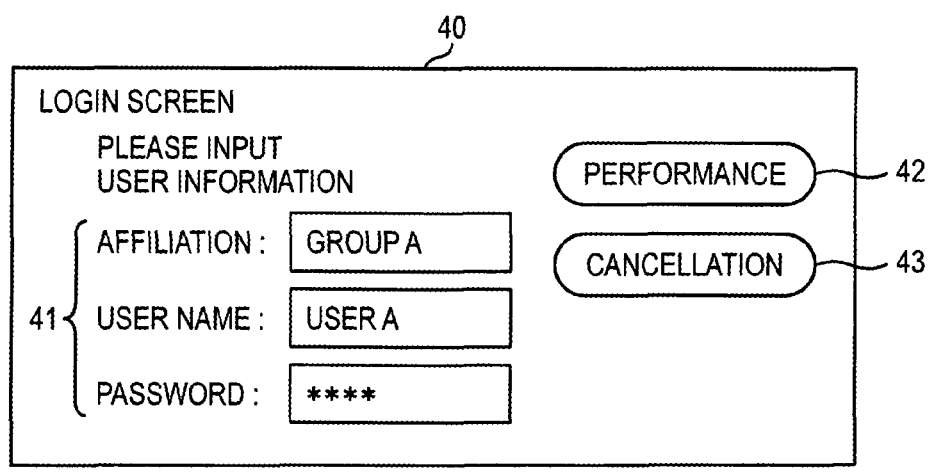
FIG. 4 is a view illustrating a login screen which is displayed by the MFP.

When instructing the MFP 200 to perform image processing, a user to use the MFP 200 logs in to the MFP 200. FIG. 4 shows a login screen which is displayed on the operation panel 40. The login screen includes input sections 41 for inputting user information including the "AFFILIATION", "USER NAME", and "PASSWORD", respectively, and a performance button 42 for inputting a login request based on the input user information, and a cancel button 43 for inputting a cancellation request of a login operation. The user inputs user information to the input sections 41, and then touches the performance button 42.

After receiving a touch operation of the performance button 42, the MFP 200 requests the authentication server 100 to perform user authentication based on the input user information. Thereafter, according to the authentication result, the MFP 200 extracts a record from the user restriction table 341. After a processing including above-mentioned login and user authentication is completed, the MFP 200 can perform the image processing within a range permitted by the restriction information of the extracted record.

First Illustrative Embodiment

Subsequently, a login request processing which the MFP 200 performs to implement the operation of the above described image processing system 900 will be described with reference to the flow chart of FIG. 5. If the performance button 42 on the login screen is touched, the login request processing is performed by the CPU 31.

In the login request process, first, in Step S101, the CPU 31 obtains the user information which input to the input sections 41, that is, the "AFFILIATION", "USER NAME", and "PASSWORD". Thereafter, in Step S102, the CPU 31 determines whether user authentication by the authentication server 100 is necessary. Specifically, in a case where "LOCAL" has been input to the "AFFILIATION", the CPU 31 determines that authentication by the authentication server 100 is unnecessary; otherwise, the CPU 31 determines that authentication by the authentication server 100 is necessary.

In a case where it is determined that authentication by the authentication server 100 is necessary ("YES" in Step S102), in Step S103, the CPU 31 outputs an authentication request to the authentication server 100. The authentication request includes the user information obtained in Step S101.

Figure 6:
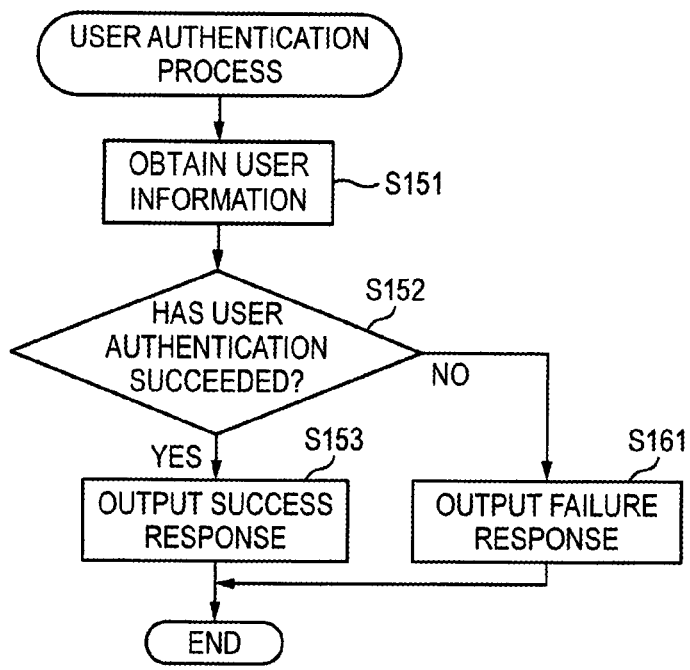
FIG. 6 is a flow chart illustrating the procedure of a user authentication processing which is performed by the authentication server.

Now, a user authentication processing which is performed by the authentication server 100 will be described with reference to the flow chart of FIG. 6. If the authentication request is received, the user authentication processing is performed by the CPU 51.

In the user authentication process, first, in Step S151, the CPU 51 obtains the user information included in the authentication request. Specifically, the CPU 51 obtains the information of "AFFILIATION", "USER NAME", and "PASSWORD". Thereafter, in Step S152, the CPU 51 performs the user authentication and determines whether the user authentication has succeeded. In Step S152, the CPU 51 searches for a record whose "AFFILIATION", "USER NAME", and "PASSWORD" being coincident with those of the user information obtained in Step S151, with reference to the user registration table 541. If a coincident record has been found, the CPU 51 determines that the authentication has succeeded; whereas if any coincident record has not been found, the CPU 51 determines that the authentication has failed.

After Step S152, the CPU 51 transmits the result of the user authentication to the MFP 200 that output the authentication request. That is, in a case where the user authentication has succeeded ("YES" in Step S152), in Step S153, the CPU 51 responses a result representing that the user authentication has succeeded. Meanwhile, in a case where the user authentication has failed ("NO" in Step S152), in Step S161, the CPU 51 responses a result representing that the user authentication has failed. After Step S153 or S161, the CPU 51 finishes the user authentication processing of the authentication server 100.

Figure 5:
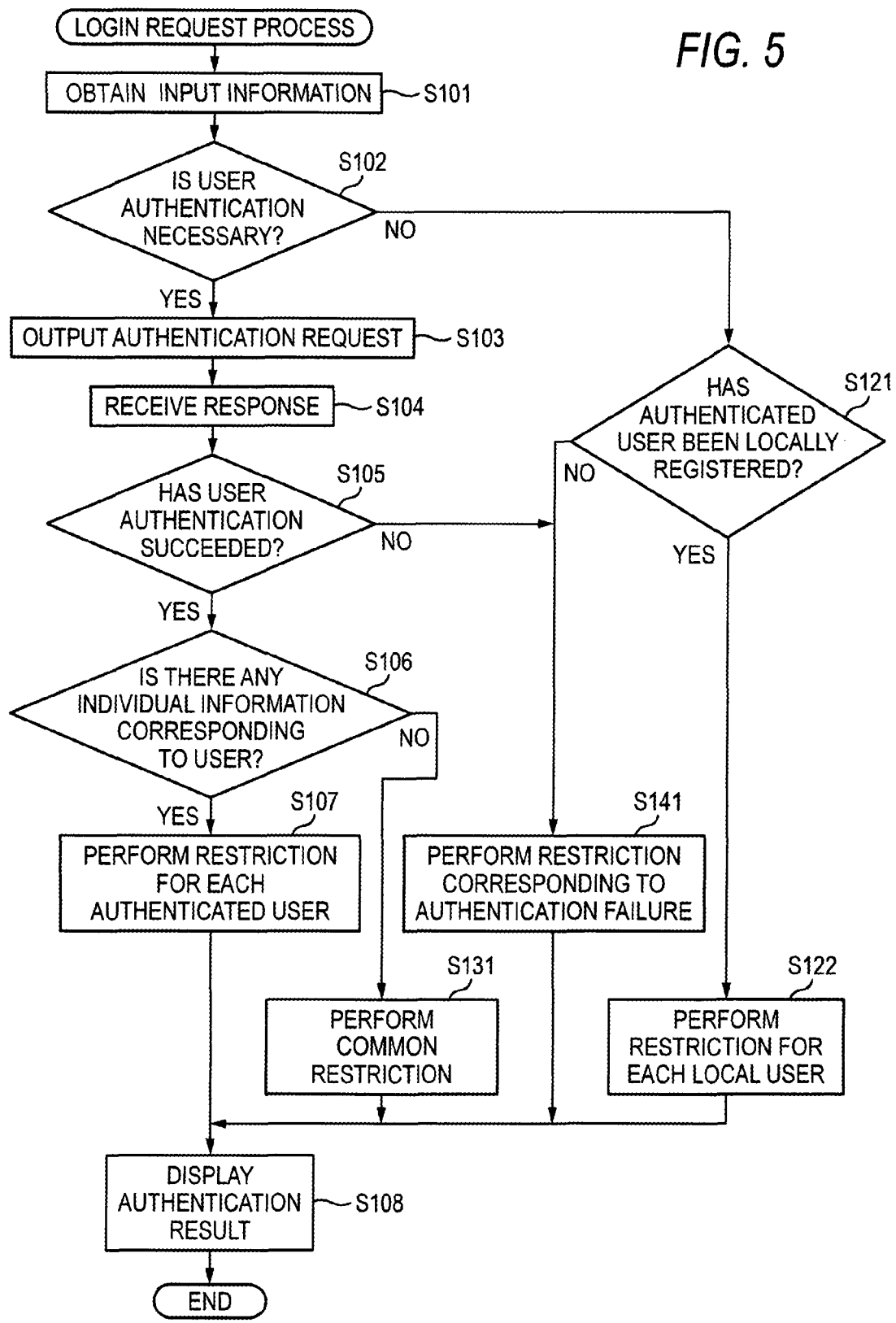
FIG. 5 is a flow chart illustrating the procedure of a login request processing which is performed by the MFP of the first illustrative embodiment.

Returning to the description of the login request processing of the MFP 200 of FIG. 5, after requesting the authentication processing in Step S103, in Step S104, the CPU 31 receives the authentication result from the authentication server 100. Thereafter, in Step S105, based on the received authentication result, the CPU 31 determines whether the user authentication by the authentication server 100 has succeeded.

In a case where it is determined that the user authentication by the authentication server 100 has succeeded ("YES" in Step S105), in Step S106, with reference to the user restriction table 341, the CPU 31 determines whether there is any individual information corresponding to the authenticated user by searching an authenticated-user individual record whose "AFFILIATION" and "USER NAME" are coincident with those of the authenticated user.

In a case where there is an individual information corresponding to the authenticated user ("YES" in Step S106), in Step S107, the CPU 31 performs restriction on the image processing operated by each authenticated user, based on the restriction information of each corresponding authenticated-user individual record. In a case where there is no individual information corresponding to the authenticated user ("NO" in Step S106), in Step S131, the CPU 31 performs common restriction for authenticated users, based on the restriction information of the authenticated-user common record.

Meanwhile, in a case where it is determined that the user authentication by the authentication server 100 has failed ("NO" in Step S105), in Step S141, the CPU 31 performs restriction corresponding to authentication failure on MFC 200. In the present illustrative embodiment, all kinds of image processing of the MFP 200 are unavailable to be operated.

Also, returning to the description of Step S102, in a case where it is determined that user authentication by the authentication server 100 is unnecessary ("NO" in Step S102), in Step S121, the CPU 31 determines whether the user is a user having been locally registered. In Step S121, with reference to the user restriction table 341, the CPU 31 searches a local-user individual record whose "USER NAME" and "PASSWORD" are coincident with those of the user information obtained in Step S101. Then, if a coincident record has been found, the CPU 31 determines that the user is a user having been locally registered; whereas if any record has not been found, the CPU 31 determines that the user is not a user having been locally registered.

In a case where the user is a user having been locally registered ("YES" in Step S121), in Step S122, the CPU 31 performs restriction on the image processing operated by each local user, based on the restriction information of each corresponding local-user individual record. In a case where the user is a user having not been locally registered ("NO" in Step S121), in Step S141, the CPU 31 performs restriction corresponding to authentication failure on MFC 200.

After Step S107, S122, S131, or S141, in Step S108, the CPU 31 displays the result of the user authentication by the authentication server 100, or the search result of the locally registered user. After Step S108, the CPU 31 finishes the login request process.

According to the login request processing of the first illustrative embodiment, in the case where the user authentication by the authentication server 100 has succeeded, and the MFP 200 can obtain the authenticated-user individual record with respect to the authenticated user, the MFP 200 restricts performance of image processing based on the restriction information of the authenticated-user individual record. Meanwhile, in the case where authentication by the authentication server 100 has succeeded, but the MFP 200 cannot obtain any individual restriction information applied to the authenticated user, the MFP 200 restricts performance of image processing based on the restriction information of the authenticated-user common record. Therefore, it is possible to reduce both of the inconvenience of users and trouble of the administrator.

There is an example case. Records of all employees are registered on the authentication server 100 by an administrator "A" of a department generally managing a company. The MFP 200 is located in a specific department. Authenticated-user individual records of employees belonging to the specific department are registered in the MFP 200 by an administrator "B" of the specific department. In the example case, in a case where an employee "C" who does not belong to the specific department uses the MFP 200, user authentication by the authentication server 100 succeeds, performance of image processing based on the authenticated-user common record becomes available. That is, it is avoided a situation in which after a user is authenticated by the authentication server 100, the user cannot use the MFP 200, and thus inconvenience of users is reduced. Also, since it is unnecessary to register an authenticated-user individual record for that employee who does not belong to the specific department in order to enable the employee to temporarily use the MFP 200, thus trouble of the administrator "B" is less.

Also, even in a case where it is impossible to obtain information necessary for user authentication in the authentication server 100, since the MFP 200 has the local-user individual records which do not need user authentication, the MFP 200 can restrict performance of image processing in detail based on the restriction information of the local-user individual records. Therefore, for example, when enable a relevant person who does not belong to the company to use the MFP 200, the administrator "B" registers the relevant person in the MFP 200, whereby it can be avoid a situation in which the relevant person cannot use the MFP 200 at all. Also, since it is unnecessary to expressly register the relevant person in the authentication server 100 in order to enable the relevant person to temporarily use the MFP 200, trouble of the administrator "A" is also less.

Second Illustrative Embodiment

Subsequently, another illustrative embodiment of the MFP 200 will be described. In the second illustrative embodiment, in addition to the authenticated-user common record and the authenticated-user individual records, common records for authenticated users in group units are set as records for authenticated users.

Specifically, the MFP 200 of the second illustrative embodiment registers common records which are for authenticated users in group units and each have the "AFFILIATION" specified, and have "AUTHENTICATED USER" as the "USER NAME", in the user restriction table 341, as shown in FIG. 7. Hereinafter, those records will be referred to as group common records. Records having IDs "006" and "007" correspond to those group common records. Each common record for a group is an example of group restriction information.

The group common records take precedence over the authenticated-user common record without the "AFFILIATION" specified. Therefore, for example, a user belonging to Group B corresponds to both of a record having an ID "000" and a record having an ID "007"; however, performance of image processing is restricted based on the restriction information of the common record for a group having the ID "007". Also, a user who belongs to Group A and for who there is any authenticated-user individual record registered in the user restriction table 341, for example, like "User 3" registered in the user registration table 541, corresponds to both of the record having the ID "000" and the record having the ID "006"; however, performance of image processing is restricted based on the restriction information of the common record for a group having the ID "006". Meanwhile, for example, with respect to a user belonging to Group C, since there is no common record for a group corresponding to Group C, performance of image processing is restricted based on the restriction information of the authenticated-user common record without specifying the "AFFILIATION".

Also, the number of the object users of each common record for a group is larger than that of each authenticated-user individual record and is smaller than that of the authenticated-user common record. Therefore, it is preferable that the group common records should further restrict performance of image processing as compared to the authenticated-user individual records. Meanwhile, it is preferable that the group common records should further permit performance of image processing as compared to the authenticated-user common record. Specifically, in the group common records, performable function and performable amount of image processing are less as compared to the authenticated-user individual records, and are more as compared to the authenticated-user common record Also, in the user restriction table 341 shown in FIG. 7, it is possible to entrust about permission of each kind of image processing or a performable amount in each record to another record. That is, the MFP 200 stores the inheritance order of the records, and makes the restriction contents of a predetermined item according to a record higher in the inheritance order.

For example, the inheritance order is set in descending order of the number of the object users, that is, in the order of the authenticated-user common record, the group common records, and the authenticated-user individual records. Further, it is assumed that records as shown in FIG. 7 are registered in the user restriction table 341. In the restriction information, a symbol "Δ" represents an option representing that the restriction contents should follow a record immediately higher in the inheritance order.

In this case, for example, in a case of the authenticated-user individual record having the ID "001", in each of the "PRINTING", "COPYING", and "MAXIMUM NUMBER", the option "Δ" has been set. Therefore, with respect to each of these, first, the restriction contents accord to a common record for a group immediately higher. In a case of the record having the ID "001", since the "AFFILIATION" is "Group A", a corresponding common record for a group becomes the record having the ID "006". In the record having the ID "006", the "PRINTING" and "COPYING" are "○". Therefore, in the record having the ID "001", the "PRINTING" and "COPYING" becomes "○". Meanwhile, even in the record having the ID "006", the "MAXIMUM NUMBER" is "Δ". Therefore, in the record having the ID "001", the "MAXIMUM NUMBER" becomes "500" with reference to an authenticated-user common record which is higher in the inheritance order, that is, the record having the ID "000". Like this, the restriction contents of a record can be made succeed to the restriction contents of another record. Therefore, it is possible to collectively set the restriction information of a plurality of records, and thus setting of restriction becomes easier.

Figure 8:
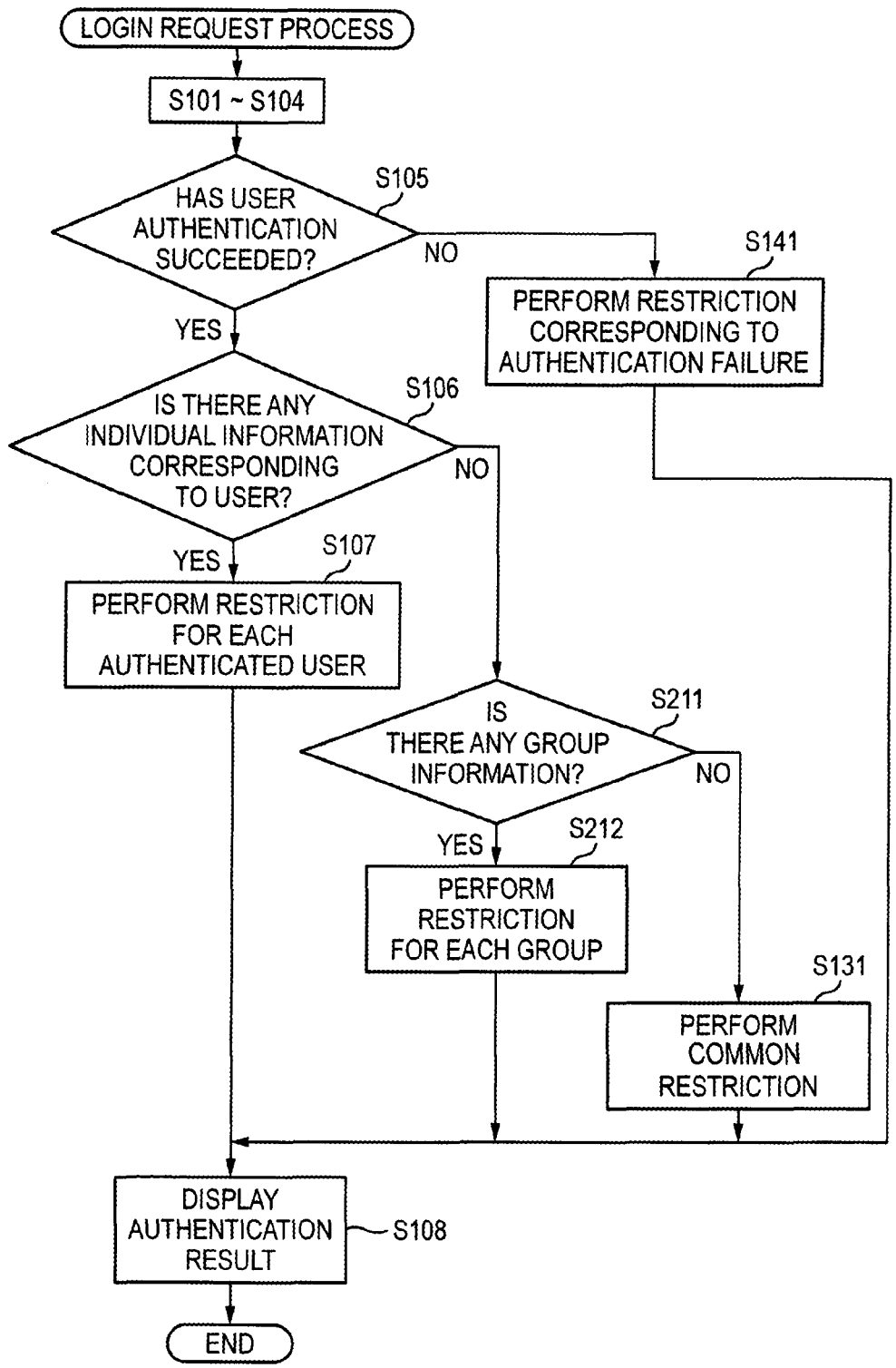
FIG. 8 is a flow chart illustrating the procedure of a login request processing which is performed by the MFP of the second illustrative embodiment.

Subsequently, a login request processing of the MFP 200 of the second illustrative embodiment described above will be described with reference to the flow chart of FIG. 8. Operations identical to those of the login request processing of the first illustrative embodiment are denoted by the same reference symbols. The operations of Steps S101 to S108 are common with the first illustrative embodiment, and thus will not be described.

In the login request processing of the second illustrative embodiment, in the case where it is determined that the user authentication by the authentication server 100 has succeeded ("YES" in Step S105), if there is no information corresponding to the authenticated user in the MFP 200 ("NO" in Step S106), in Step S211, the CPU 31 determines whether there is any information relating to a group, to which the authenticated user belongs, that is, whether there is any group common record corresponding to the group, to which the authenticated user belongs.

In a case where there is information relating to the group, to which the authenticated user belongs ("YES" in Step S211), in Step S212, the CPU 31 performs restriction for each group based on the restriction information stored in the corresponding common record for a group. In a case where there is no information relating to the group, to which the authenticated user belongs ("NO" in Step S211), in Step S131, the CPU 31 performs restriction on the authenticated user based on the authenticated-user common record.

According to the login request processing of the second illustrative embodiment, in a case where the user authentication by the authentication server 100 has succeeded and also the MFP 200 cannot obtain any authenticated-user individual record relating to the authenticated user, if there is any group common record corresponding to the group, to which the authenticated user belongs, the MFP 200 restricts performance of image processing based on the restriction information of that group unit. Therefore, it is possible to perform restriction on performance of image processing with a higher degree of freedom.

Third Illustrative Embodiment

Hereinafter, another illustrative embodiment of the MFP 200 will be described. In a third illustrative embodiment, the MFP 200 is connected to a plurality of authentication servers. Also, as shown in FIG. 9, an "SERVER" is added to each record of the user restriction table 341 which is stored in a server for performing user authentication. Also, a table (not shown) having the address of a server to be the output destination of an authentication request for each "AFFILIATION" is stored. Further, in the third illustrative embodiment, server common record is set for authenticated users in server units, in addition to the authenticated-user common record, the authenticated-user individual records, and the group common records.

Specifically, the MFP 200 of the third illustrative embodiment registers common records for authenticated users each of which specifies a server, and has "-" meaning that the "AFFILIATION" has not been set, and has "AUTHENTICATED USER" as the "USER NAME", in units of servers, in the user restriction table 341. Hereinafter, these records will be referred to as server common records. A record having an ID "008" corresponds to a common record for a server. Each common record for a server is an example of server restriction information.

The server common records take precedence over the authenticated-user common record without specifying the "SERVER". Meanwhile, the server common records do not take precedence over the authenticated-user individual records. Also, any one side of the server common records and the group common records may take precedence over the other side; however, it is preferable that the side having a less number of the object users should take precedence. In the present illustrative embodiment, the group common records take precedence over the server common records.

The number of the object users of the group common records is larger than that of the authenticated-user individual records and is smaller than that of the authenticated-user common record. Therefore, it is preferable that the server common records should further restrict performance of image processing as compared to the authenticated-user individual records. Meanwhile, it is preferable that the server common records should further permit performance of image processing as compared to the authenticated-user common record. Specifically, in the server common records, performable function and performable amount of image processing are less as compared to the authenticated-user individual records, and are more as compared to the authenticated-user common record.

Figure 10:
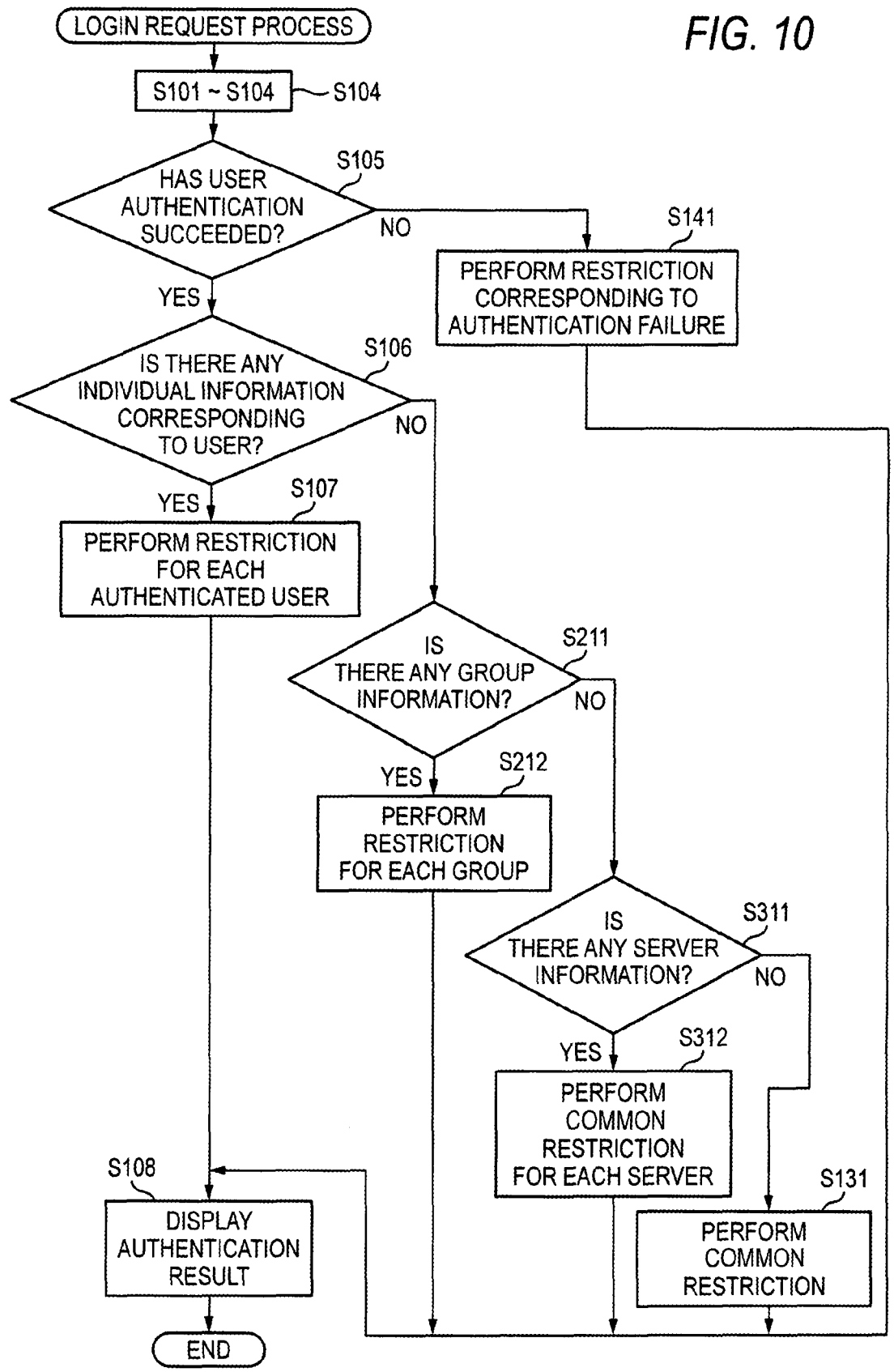
FIG. 10 is a flow chart illustrating the procedure of a login request processing which is performed by the MFP of the third illustrative embodiment.

Subsequently, a login request processing of the MFP 200 of the third illustrative embodiment described above will be described with reference to the flow chart of FIG. 10. Operations identical to those of the login request processing of the first or second illustrative embodiment are denoted by the same reference symbols. The operations of Steps S101 to S108 and the operations of Steps S211 and S212 are common, and thus will not be described.

In the login request processing of the third illustrative embodiment, in the case where it is determined that the user authentication by the authentication server 100 has succeeded ("YES" in Step S105) and also there is no individual information corresponding to the authenticated user in the MFP 200 ("NO" in Step S106), if there is no information relating to the group, to which the authenticated user belongs ("NO" in Step S211), in Step S311, the CPU 31 determines whether there is any information relating to a server performing such authentication, that is, whether there is any server common record corresponding to the server performing such authentication.

In a case where there is information relating to the server performing such authentication ("YES" in Step S311), in Step S312, the CPU 31 performs restriction for each server, based on the restriction information stored in the corresponding common record for a server. In a case where there is no information relating to the server performing such authentication ("NO" in Step S311), in Step S131, the CPU 31 performs restriction on the authenticated user based on the authenticated-user common record.

According to the login request processing of the third illustrative embodiment, in the case where the user authentication in the authentication server 100 has succeeded and also the MFP 200 cannot obtain any authenticated-user individual record relating to the authenticated user, if there is any server common record corresponding to the server performing such authentication, the MFP 200 restricts performance of image processing based on the restriction information of that server unit. Therefore, it is possible to perform restriction on performance of image processing with a higher degree of freedom.

Also, even in the third illustrative embodiment, like the user restriction table 341 shown in FIG. 7, the restriction contents of a record may be made succeed to the restriction contents of another record. In this case, any one side of the server common records and the group common records is higher in the inheritance order; however, it is preferable that the side having a larger number of users which are object should be higher in the inheritance order. Therefore, in the present illustrative embodiment, the server common records are set to be higher than the group common records in the inheritance order.

Also, in the third illustrative embodiment, the group common records are set, and it is determined in the login request processing whether there is any group common record corresponding to the group, to which the authenticated user belongs. However, any group common records may not be set.

As described above, in the MFP 200 of each illustrative embodiment, in the case where the user authentication has succeeded, even if there is no authenticated-user individual record (individual restriction information) corresponding to the user, performance of image processing is restricted based on the authenticated-user common record (the common restriction information) which does not specify any user. Therefore, at least users having succeeded in user authentication can perform at least some kinds of image processing, without setting of individual restriction information by the administrator. Therefore, inconvenience of users is reduced, and trouble of the administrator is less.

Also, the illustrative embodiments are merely simple example, and do not limit this disclosure. Therefore, it is apparent that this disclosure can include a variety of changes and modifications of the illustrative embodiments without departing from the gist of this disclosure. For example, the image processing apparatus needs only to have an image processing function, and thus may be a copy machine, a printer, a scanner, or a facsimile other than the MFP 200.

Also, in the illustrative embodiments, the user inputs the user information through the operation panel 40. However, the input method of the user information is not limited thereto. For example, a device for reading an IC tag or an IC card may be provided in the MFP 200 so as to read user information stored in an IC.

Also, in the illustrative embodiments, before outputting the authentication request, in Step S102, the CPU 31 determines whether user authentication by the authentication server 100 is necessary. In a case where it is unnecessary, the CPU 31 determines existence or non-existence of local registration. However, Step S102 may be omitted. In this case, after acquiring the user information in Step S101, the CPU 31 outputs the authentication request in Step S103. Thereafter, if the user authentication has not succeeded ("NO" in Step S105), the CPU 31 may determine existence or non-existence of local registration and determine the contents of restriction according to the determination result.

Also, in the illustrative embodiments, in the case where the user authentication by the authentication server 100 has failed, or in the case where there is no local registration, all kinds of image processing of the MFP 200 are restricted. However, a record for a case where user authentication has failed, or for a case where there is no local registration may be provided to permit performance of some kinds of the image processing.

Figure 11:
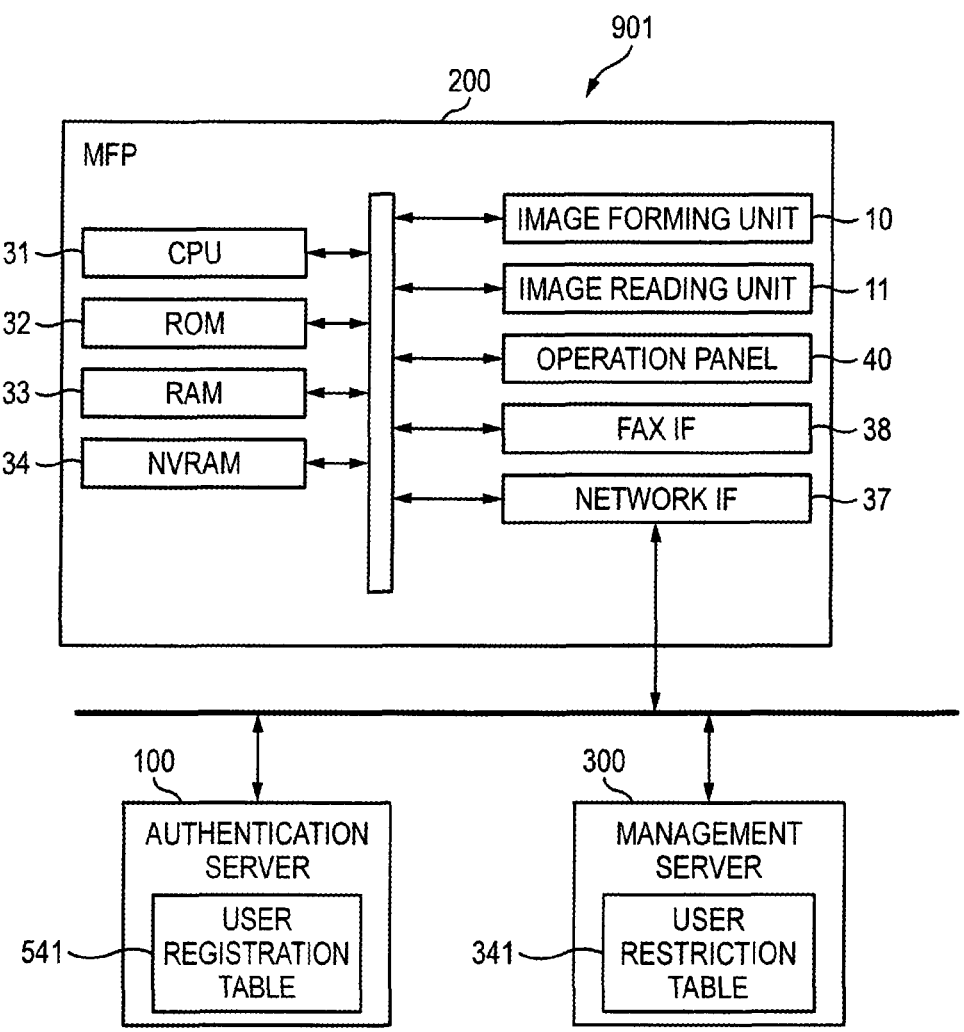
FIG. 11 is a block diagram illustrating another configuration of the image processing system according to the illustrative embodiment.

Also, in the illustrative embodiments, the MFP 200 has the user restriction table 341. However, as shown in FIG. 11, a management server 300 (an example of a management information server) having the user restriction table 341 may be provided, and the MFP 200 may obtain restriction information of image processing from the management server 300, based on the result of the authentication in the authentication server 100. If the MFP 200 obtains restriction information of image processing from the management server 300 which is an external device, it is possible to reduce the load of the memory of the MFP 200. Also, if the management server 300 is commonly used by a plurality of image processing apparatuses, trouble to set restriction information in the plurality of image processing apparatuses is saved. Meanwhile, if the MFP 200 has the user restriction table 341 and reads restriction information of image processing, it is possible to reduce communication load and it is possible to reduce the risk of the MFP 200 being influenced by the status of communication.

Also, in the illustrative embodiments, in the case where user authentication by the authentication server 100 is unnecessary, the CPU 31 determines existence or non-existence of local registration, and obtains restriction information for each local user. However, this disclosure is not limited thereto. For example, a common record (a record having an ID "999" in FIG. 12) for unauthenticated users who do not need user authentication by the authentication server 100 may be provided as shown in FIG. 12, and in a case where user authentication by the authentication server 100 is unnecessary, the CPU 31 may restrict performance of image processing based on the common record for unauthenticated users. The common record for unauthenticated users is also an example of the unauthenticated restriction information.

Also, a record for a case where user authentication by the authentication server 100 is unnecessary may not be provided. In this case, if user authentication by the authentication server 100 is unnecessary, the CPU 31 performs restriction corresponding to authentication failure, without performing determination on local registration.

Also, in the illustrative embodiments, the authenticated-user individual records for individual users are provided, and if there is an authenticated-user individual record corresponding to an authenticated user, based on that record, the CPU 31 performs restriction on performance of image processing for the individual user. However, this disclosure is not limited thereto. For example, in all cases where there is no authenticated-user individual record registered in the user restriction table 341, and there is only the authenticated-user common record registered, and it is determined in Step S105 that a user has authenticated, performance of image processing may be restricted based on the authenticated-user common record.

Also, the processes disclosed in the illustrative embodiments may be performed by a single CPU, a plurality of CPUs, hardware such as an ASIC, or a combination of them. Further, the processes disclosed in the illustrative embodiments can be implemented in various forms such as a recording medium having programs for performing those processes, or methods of performing those processes.

What is claimed is:

1. An image processing apparatus comprising:
   a human interface device configured to receive input of authentication information;
   a communication unit configured to communicate with a server, the server being configured to perform user authentication in accordance with the authentication information;
   an image processing unit configured to perform image processing;
   a storage device configured to store common restriction information corresponding to information for a plurality of users and individual restriction information corresponding to information for an individual user, wherein the individual restriction information and the common restriction information each indicate at least one of performable image processing and performable amount of image processing; and
   a control device configured to perform:
      determining whether user authentication to the server is necessary;
      transmitting the authentication information received by the human interface device to the server, when it is determined that the user authentication by the server is necessary;
      receiving a result of user authentication from the server, the result indicating a specific user authenticated by the server;
      determining whether individual restriction information for the specific user is stored in the storage device;
      restricting performance of image processing associated with the specific user based on the individual restriction information for the specific user, when it is determined that individual restriction information for the specific user is stored in the storage device;
      restricting the performance of the image processing associated with the specific user based on the common restriction information, when it is determined that individual restriction information for the specific user is not stored in the storage device;
      determining, when it is determined that the user authentication by the server is not necessary, whether unauthenticated restriction information corresponding to the authentication information is stored in the storage device, the unauthenticated information indicating at least one of the performable image processing and performable amount of the image processing;
      restricting the performance of the image processing based on the unauthenticated restriction information, when it is determined that the unauthenticated restriction information is stored in the storage device; and
      restricting the performance of the image processing based on authentication failure, when it is determined that the unauthenticated restriction information is not stored in the storage device.

2. The image processing apparatus according to claim 1, wherein the control device is further configured to perform:
   determining whether group restriction information is stored in the storage device, the group restriction information indicating at least one of performable image processing and performable amount of image processing;
   restricting the performance of the image processing based on the group restriction information, when the group restriction information is stored in the storage device; and
   restricting the performance of the image processing based on the common restriction information, when the group restriction information is not stored in the storage device.

3. An image processing apparatus comprising:
   a human interface device configured to receive input of authentication information;
   a communication unit configured to communicate with a server, the server being configured to perform user authentication in accordance with the authentication information;
   an image processing unit configured to perform image processing;
   a storage device configured to store common restriction information corresponding to information for a plurality of users and individual restriction information corresponding to information for an individual user, wherein the individual restriction information and the common restriction information each indicate at least one of performable image processing and performable amount of image processing; and
   a control device configured to perform:
      transmitting the authentication information received by the human interface device to the server;
      receiving a result of user authentication from the server, the result indicating a specific user authenticated by the server;
      determining whether individual restriction information for the specific user is stored in the storage device;
      restricting the performance of image processing based on the individual restriction information when it is determined that the individual restriction information is stored in the storage device; and
   restricting the performance of the image processing associated with the specific user based on the common restriction information, when it is determined that individual restriction information is not stored in the storage device,
   wherein the control device is further configured to perform:
      determining whether server restriction information is stored in the storage device, the server restriction information indicating at least one of performable image processing and performable amount of image processing;

restricting the performance of the image processing based on the server restriction information, when the server restriction information is stored in the storage device; and restricting the performance of the image processing based on the common restriction information, when the server restriction information is not stored in the storage device.

4. The image processing apparatus according to claim 1, wherein the control device is further configured to perform:

acquiring an inheritance order with respect to a plurality of kinds of restriction information including at least the common restriction information and the individual restriction information; and when restriction information of the image processing refers to other restriction information, determining restriction of the image processing according to the other restriction information when an inheritance order of the other restriction information is higher than an inheritance order of the restriction information.

5. The image processing apparatus according to claim 1, wherein the control device is further configured to obtain the common restriction information and the individual restriction information from the storage device.

6. An image processing system which includes an image processing apparatus for performing image processing, and a server storing user information identifying users, the image processing system comprising:

a storage device configured to store common restriction information applicable to a plurality of individual users, and one or more individual restrictions, the one or more individual restrictions each applicable to an individual user, wherein the common restriction information and the one or more individual restrictions each indicate at least one of performable image processing and performable amount of the image processing; and a control device configured to perform:

determining whether user authentication by the server is necessary;

transmitting authentication information of a user received by the image processing apparatus to the server, when it is determined that the user authentication by the server is necessary;

performing user authentication based on the authentication information and user information on the server;

determining whether an individual restriction for the user is stored in the storage device;

restricting performance of image processing based on the individual restriction for the user, when it is determined that the individual restriction for the user is stored in the storage device; and restricting the performance of the image processing based on the common restriction information, when it is determined that the individual restriction for the user is not stored in the storage device;

determining, when it is determined that the user authentication by the server is not necessary, whether unauthenticated restriction information is stored in the storage device, the unauthenticated information indicating at least one of the performable image processing and performable amount of the image processing;

restricting the performance of the image processing based on the unauthenticated restriction information, when it is determined that the unauthenticated restriction information is stored in the storage device; and restricting the performance of the image processing based on authentication failure, when it is determined that the unauthenticated restriction information is not stored in the storage device.

* * * * *